United States Patent
Maruyama et al.

(10) Patent No.: US 12,529,499 B2
(45) Date of Patent: Jan. 20, 2026

(54) AIR-CONDITIONING APPARATUS AND AIR-CONDITIONING SYSTEM

(71) Applicant: Mitsubishi Electric Corporation, Tokyo (JP)

(72) Inventors: Hiroki Maruyama, Tokyo (JP); Yuji Motomura, Tokyo (JP); Hiroyuki Okano, Tokyo (JP); Kazuyoshi Shinozaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 18/550,140

(22) PCT Filed: May 14, 2021

(86) PCT No.: PCT/JP2021/018305
§ 371 (c)(1),
(2) Date: Sep. 12, 2023

(87) PCT Pub. No.: WO2022/239212
PCT Pub. Date: Nov. 17, 2022

(65) Prior Publication Data
US 2024/0151438 A1 May 9, 2024

(51) Int. Cl.
*F25B 13/00* (2006.01)

(52) U.S. Cl.
CPC ........ *F25B 13/00* (2013.01); *F25B 2313/003* (2013.01); *F25B 2313/006* (2013.01); *F25B 2313/0233* (2013.01)

(58) Field of Classification Search
CPC ............... F25B 13/00; F25B 2313/003; F25B 2313/006; F25B 2313/0233
See application file for complete search history.

(56) References Cited

U.S. PATENT DOCUMENTS

| 9,631,826 B2 | 4/2017 | Kimura et al. |
| 2011/0314848 A1* | 12/2011 | Tanaka ............ F25B 7/00 62/238.7 |

(Continued)

FOREIGN PATENT DOCUMENTS

| CN | 102326039 B | 7/2013 |
| GB | 2555258 A | 4/2018 |

(Continued)

OTHER PUBLICATIONS

International Search Report of the International Searching Authority mailed Aug. 3, 2021 for the corresponding International Application No. PCT/JP2021/018305 (and English translation).

(Continued)

*Primary Examiner* — Miguel A Diaz
(74) *Attorney, Agent, or Firm* — Posz Law Group, PLC

(57) ABSTRACT

An air-conditioning apparatus includes an outdoor unit including a compressor configured to compress refrigerant, a relay unit connected to the outdoor unit, and an indoor unit connected to the relay unit. The compressor is driven to circulate the refrigerant between the outdoor unit, the relay unit, and the indoor unit. The air-conditioning apparatus includes a supplementary heat source unit in parallel with the indoor unit and connected to the relay unit. The outdoor unit includes an outdoor heat exchanger configured to exchange heat between the refrigerant flowing through the outdoor heat exchanger and a fluid. The supplementary heat source unit includes a supplementary heat exchanger configured to exchange heat between the refrigerant flowing through the supplementary heat exchanger and hot water.

10 Claims, 8 Drawing Sheets

(56) References Cited

U.S. PATENT DOCUMENTS

| | | |
|---|---|---|
| 2012/0204588 A1 | 8/2012 | Takenaka et al. |
| 2015/0034293 A1 | 2/2015 | Takayama et al. |
| 2017/0130997 A1 | 5/2017 | Honda |

FOREIGN PATENT DOCUMENTS

| | | |
|---|---|---|
| JP | H05-306848 A | 11/1993 |
| JP | 2000-002474 A | 1/2000 |
| WO | 2011048695 A1 | 4/2011 |
| WO | 2013/144994 A1 | 10/2013 |
| WO | 2016/189739 A1 | 12/2016 |

OTHER PUBLICATIONS

Extended European Search Report dated Apr. 30, 2024 issued in corresponding European patent application No. 21941944.7.

* cited by examiner

AIR-CONDITIONING APPARATUS AND AIR-CONDITIONING SYSTEM

CROSS REFERENCE TO RELATED APPLICATION

This application is a U.S. national stage application of PCT/JP2021/018305 filed on May 14, 2021, the contents of which are incorporated herein by reference.

TECHNICAL FIELD

The present disclosure relates to an air-conditioning apparatus including a relay unit, and relates to an air-conditioning system.

BACKGROUND ART

A known typical air-conditioning apparatus includes an outdoor unit and multiple indoor units connected to the outdoor unit. At low outdoor air temperatures, a heating operation of the air-conditioning apparatus causes frost to form on surfaces of fins of an outdoor heat exchanger serving as an evaporator. The formation of frost increases a pressure loss in air passages in the outdoor heat exchanger, leading to lower heat transfer performance. It is therefore necessary to defrost the outdoor heat exchanger at regular time intervals. Known methods of defrosting the outdoor heat exchanger include performing a defrosting operation in which a refrigerant flow direction for the heating operation is temporarily switched to a refrigerant flow direction for a cooling operation.

Patent Literature 1 discloses a method for continuing the heating operation even during the defrosting operation. As described in Patent Literature 1, an outdoor side heat exchange unit includes multiple heat exchangers. Even while one heat exchanger of the outdoor side heat exchange unit is being defrosted, the other heat exchanger operates as an evaporator. The one heat exchanger that has completely been defrosted operates as an evaporator, and the other heat exchanger is defrosted. An air-conditioning apparatus disclosed in Patent Literature 1 repeats such an operation to continue the heating operation.

CITATION LIST

Patent Literature

Patent Literature 1: International Publication No. 2016/189739

SUMMARY OF INVENTION

Technical Problem

A typical defrosting operation interrupts heating for an indoor space. During the defrosting operation disclosed in Patent Literature 1, high-temperature and high-pressure refrigerant discharged from a compressor is used to defrost the outdoor heat exchanger. This causes a shortage of refrigerant in an indoor unit performing heating. The air-conditioning apparatus may fail to fully exhibit the heating capacity.

In response to the above issue, it is an object of the present disclosure to provide an air-conditioning apparatus and an air-conditioning system that are capable of reducing or eliminating the formation of frost on an outdoor heat exchanger in a heating operation.

Solution to Problem

An air-conditioning apparatus according to an embodiment of the present disclosure includes an outdoor unit including a compressor configured to compress refrigerant, a relay unit connected to the outdoor unit, and an indoor unit connected to the relay unit. The compressor is driven to circulate the refrigerant between the outdoor unit, the relay unit, and the indoor unit. The air-conditioning apparatus includes a supplementary heat source unit in parallel with the indoor unit and connected to the relay unit. The outdoor unit includes an outdoor heat exchanger configured to exchange heat between the refrigerant flowing through the outdoor heat exchanger and a fluid. The supplementary heat source unit includes a supplementary heat exchanger configured to exchange heat between the refrigerant flowing through the supplementary heat exchanger and hot water.

Advantageous Effects of Invention

In the air-conditioning apparatus according to one embodiment of the present disclosure and an air-conditioning system according to another embodiment of the present disclosure, the refrigerant heated to a high temperature through the supplementary heat exchanger is supplied to the outdoor heat exchanger in the outdoor unit in a heating operation. Thus, the air-conditioning apparatus and the air-conditioning system can reduce or eliminate the formation of frost on the outdoor heat exchanger in the heating operation.

DESCRIPTION OF EMBODIMENTS

Embodiment 1

Figure 1:
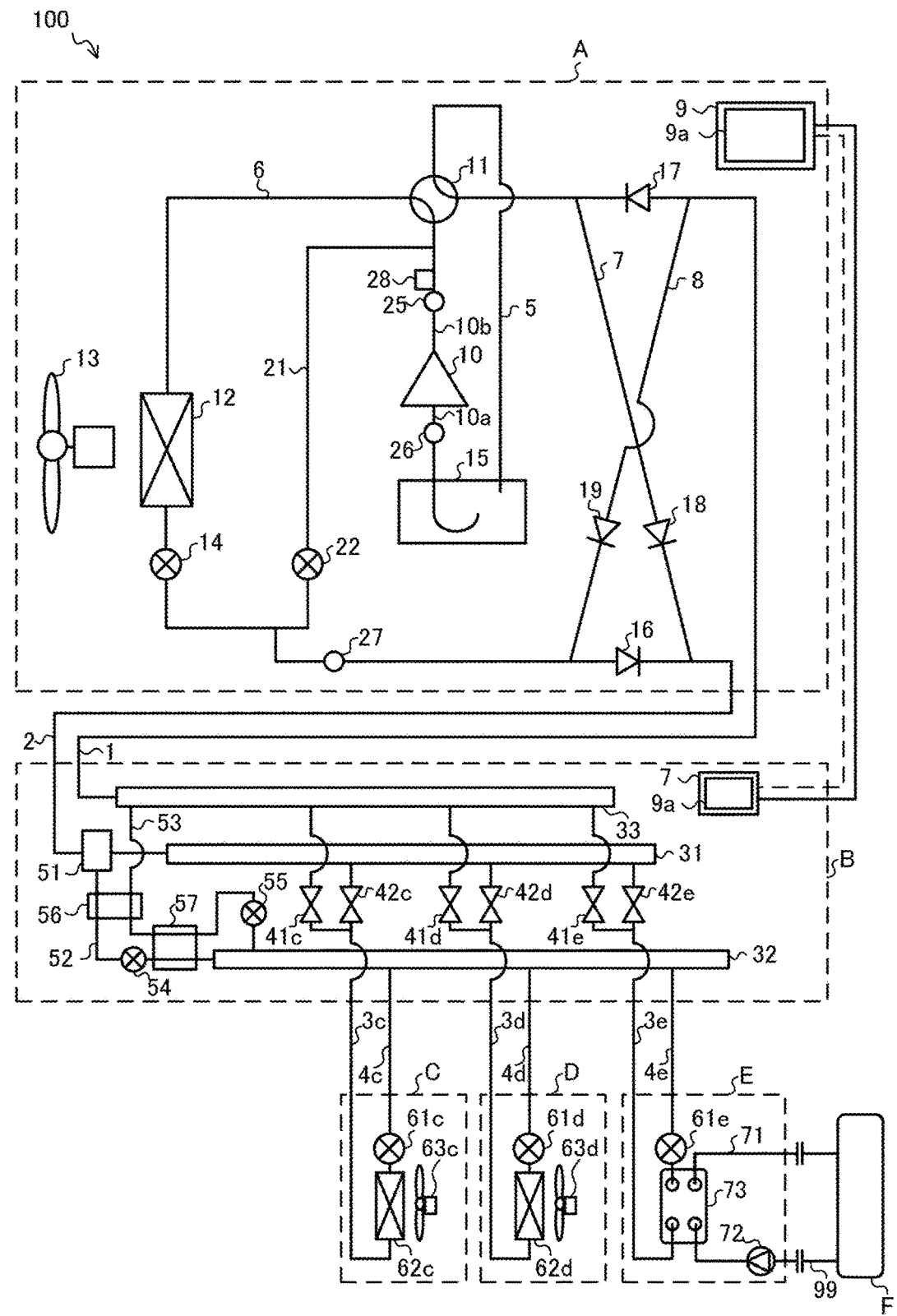
FIG. 1 is a circuit diagram illustrating an air-conditioning apparatus 100 according to Embodiment 1.

An air-conditioning apparatus 100 according to Embodiment 1 of the present disclosure will be described below with reference to the drawings. Note that the relationship between the sizes of components in the following figures may differ from the relationship between the sizes of actual components. FIG. 1 is a circuit diagram illustrating the air-conditioning apparatus 100 according to Embodiment 1. As illustrated in FIG. 1, the air-conditioning apparatus 100 includes an outdoor unit A, a relay unit B, an indoor unit C, an indoor unit D, and a supplementary heat source unit E.

The relay unit B is interposed between the outdoor unit A and each of the indoor units C and D and the supplementary heat source unit E. The indoor units C and D and the supplementary heat source unit E are in parallel with each other and connected to the relay unit B. Embodiment 1 illustrates a case where one relay unit B, two indoor units C and D, and one supplementary heat source unit E are provided for one outdoor unit A. For each of the above connected components, the number of components is not limited to the number of components illustrated in the figures. The air-conditioning apparatus 100 may include two or more outdoor units, may include two or more relay units, may include one or three or more indoor units, and may include two or more supplementary heat source units. High and low values of, for example, temperature and pressure, described in the full text of the specification are not determined in relation to particular absolute values, but are relatively determined on the basis of, for example, a state or operation of the apparatus.

The outdoor unit A and the relay unit B are connected by a first refrigerant pipe 1 and a second refrigerant pipe 2. The first refrigerant pipe 1 is a pipe through which low-pressure refrigerant flows, and has a large diameter. The second refrigerant pipe 2 is a pipe through which high-pressure refrigerant flows, and has a smaller diameter than the diameter of the first refrigerant pipe 1. Third refrigerant pipes 3c to 3e are pipes that branch off from the first refrigerant pipe 1. Fourth refrigerant pipes 4c to 4e are pipes that branch off from the second refrigerant pipe 2. The relay unit B and the indoor unit C are connected by the third refrigerant pipe 3c and the fourth refrigerant pipe 4c. The relay unit B and the indoor unit D are connected by the third refrigerant pipe 3d and the fourth refrigerant pipe 4d. The relay unit B and the supplementary heat source unit E are connected by the third refrigerant pipe 3e and the fourth refrigerant pipe 4e.

(Outdoor Unit A)

The outdoor unit A is typically disposed in a space outside a structure such as a building, for example, a space on a roof, and supplies cooling energy or heating energy to the indoor units C and D and the supplementary heat source unit E via the relay unit B. The place of installation of the outdoor unit A is not limited to an outdoor space. For example, the outdoor unit A may be installed in an enclosed space, for example, a machine room with a ventilation opening. The outdoor unit A may be installed inside a structure as long as waste heat can be discharged out from the structure through an exhaust duct. The outdoor unit A may be a water-cooled outdoor unit and be installed inside a structure. As described above, the outdoor unit A may be installed in any place as long as waste heat can be reliably disposed of. The outdoor unit A is provided with a sensor (not illustrated) to measure an outdoor temperature.

The outdoor unit A includes a fifth refrigerant pipe 5, a sixth refrigerant pipe 6, a compressor 10, a suction pipe 10a, a discharge pipe 10b, a flow switching device 11, an outdoor heat exchanger 12, an outdoor fan 13, a first flow rate control device 14, and an accumulator 15. The first refrigerant pipe 1 and the second refrigerant pipe 2 extend into the outdoor unit A.

The first refrigerant pipe 1 connects the flow switching device 11 to the relay unit B. The second refrigerant pipe 2 connects the outdoor heat exchanger 12 in the outdoor unit A to the relay unit B. The fifth refrigerant pipe 5 connects the flow switching device 11 to the accumulator 15. The sixth refrigerant pipe 6 connects the flow switching device 11 to the outdoor heat exchanger 12.

The compressor 10 sucks refrigerant and compresses the refrigerant into a high-temperature and high-pressure state. The compressor 10 is, for example, a capacity-controllable inverter compressor. The suction pipe 10a connects an inlet of the compressor 10 to the flow switching device 11. The discharge pipe 10b connects an outlet of the compressor 10 to the flow switching device 11.

The flow switching device 11 is, for example, a four-way switching valve, and switches between a refrigerant flow direction for a heating operation and a refrigerant flow direction for a cooling operation. The flow switching device 11 switches between two connection states. In one connection state, the sixth refrigerant pipe 6 is connected to the discharge pipe 10b, and the first refrigerant pipe 1 is connected to the fifth refrigerant pipe 5. In the other connection state, the first refrigerant pipe 1 is connected to the discharge pipe 10b, and the fifth refrigerant pipe 5 is connected to the sixth refrigerant pipe 6.

The outdoor heat exchanger 12 exchanges heat between heat source side refrigerant flowing through the outdoor unit A and air supplied from the outdoor fan 13. The outdoor heat exchanger 12 serves as an evaporator in the heating operation to evaporate and gasify the refrigerant. The outdoor heat exchanger 12 serves as a condenser or a radiator in the cooling operation to condense and liquefy the refrigerant. The outdoor heat exchanger 12 is, for example, an air-cooled outdoor heat exchanger. The outdoor heat exchanger 12 may be of any type other than an air-cooled type, for example, a water-cooled type, as long as the heat exchanger is configured to exchange heat between refrigerant and a fluid other than the refrigerant.

The outdoor fan 13 is installed in proximity to the outdoor heat exchanger 12 and controls the flow rate of air that exchanges heat with refrigerant. The outdoor fan 13 is an exemplary flow rate control device that controls the flow rate of a fluid that exchanges heat with refrigerant. If the outdoor heat exchanger 12 is of the water-cooled type, a pump that supplies water to the outdoor heat exchanger 12 may be provided instead of the outdoor fan 13.

The first flow rate control device 14 is disposed between the outdoor heat exchanger 12 and check valves 16 and 19. The first flow rate control device 14 is, for example, an electronic expansion valve having a variably controllable opening degree. The first flow rate control device 14 adjusts the flow rate of refrigerant flowing from the outdoor heat exchanger 12 to the check valve 16 in the cooling operation. The first flow rate control device 14 adjusts the flow rate of refrigerant flowing from the check valve 19 to the heat exchanger 3 in the heating operation.

The accumulator 15, which is disposed on a suction side of the compressor 10, accumulates an excess of refrigerant that is generated because of the difference between the amount of refrigerant circulated in the heating operation and the amount of refrigerant circulated in the cooling operation or an excess of refrigerant that is generated during transition from an operation to another operation.

The outdoor unit A further includes a seventh refrigerant pipe 7, an eighth refrigerant pipe 8, the check valve 16, a check valve 17, a check valve 18, and the check valve 19. The seventh refrigerant pipe 7, the eighth refrigerant pipe 8, the check valve 16, the check valve 17, the check valve 18, and the check valve 19 cause high-pressure refrigerant to flow out from the outdoor unit A through the second refrigerant pipe 2, irrespective of the connection state of the flow switching device 11. Furthermore, the seventh refrigerant pipe 7, the eighth refrigerant pipe 8, the check valve 16, the check valve 17, the check valve 18, and the check valve 19 cause low-pressure refrigerant to flow into the outdoor unit A through the first refrigerant pipe 1.

The seventh refrigerant pipe 7 connects a portion of the first refrigerant pipe 1 that is located between the flow switching device 11 and the check valve 16 to a portion of the second refrigerant pipe 2 that is located between the check valve 16 and the relay unit B. The eighth refrigerant pipe 8 connects a portion of the first refrigerant pipe 1 that is located between the check valve 17 and the relay unit B to a portion of the second refrigerant pipe 2 that is located between the outdoor heat exchanger 12 and the check valve 16.

The check valve 16 is disposed at a portion of the second refrigerant pipe 2 that is located between the outdoor heat exchanger 12 and the relay unit B, and permits the refrigerant to flow only in a direction from the outdoor unit A to the relay unit B. The check valve 17 is disposed at a portion of the first refrigerant pipe 1 that is located between the relay unit B and the flow switching device 11, and permits the refrigerant to flow only in a direction from the relay unit B to the outdoor unit A. The check valve 18 is disposed at the seventh refrigerant pipe 7 and causes the refrigerant discharged from the compressor 10 in the heating operation to flow to the relay unit B. The check valve 19 is disposed at the eighth refrigerant pipe 8 and causes the refrigerant returned from the relay unit B in the heating operation to flow to the suction side of the compressor 10.

The outdoor unit A includes a first bypass pipe 21 and a second flow rate control device 22. The first bypass pipe 21 connects the discharge pipe 10b to a portion of the second pipe that is located between the first flow rate control device 14 and the check valve 16. The second flow rate control device 22 is disposed at the bypass pipe 23. The second flow rate control device 22 is, for example, an electronic expansion valve having a variably controllable opening degree. The second flow rate control device 22 adjusts the flow rate of refrigerant flowing from the compressor 10 to the check valve 16 in the cooling operation. The second flow rate control device 22 adjusts the flow rate of refrigerant flowing from the check valve 19 to the discharge pipe 10b in the heating operation.

The outdoor unit A is provided with a discharge pressure gauge 25, a suction pressure gauge 26, an intermediate pressure gauge 27, and a thermometer 28. The discharge pressure gauge 25 is disposed at the discharge pipe 10b and measures the pressure of refrigerant discharged from the compressor 10. The suction pressure gauge 26 is disposed at the suction pipe 10a and measures the pressure of refrigerant to be sucked into the compressor 10. The intermediate pressure gauge 29 is disposed at a portion of the second refrigerant pipe 2 that is located between the first and second flow rate control devices 14 and 22 and the check valves 19 and 19. The intermediate pressure gauge 29 measures an intermediate pressure that is the pressure of refrigerant flowing through the portion of the second refrigerant pipe 2 located between the first and second flow rate control devices 14 and 22 and the check valves 19 and 19. The thermometer 28 is disposed at the discharge pipe 10b and measures the temperature of refrigerant discharged from the compressor 10. Pressure information and temperature information detected by the discharge pressure gauge 25, the suction pressure gauge 26, the intermediate pressure gauge 27, and the thermometer 28 are sent to controllers 9, which control operation of the air-conditioning apparatus 100, and are used to control actuators.

(Relay Unit B)

The relay unit B includes a first branch 31, a second branch 32, a third branch 33, solenoid valves 41c to 41e and 42c to 42e, a gas-liquid separator 51, a second bypass pipe 52, a third bypass pipe 53, a third flow rate control device 54, a fourth flow rate control device 55, a first heat exchanger 56, and a second heat exchanger 57. The third refrigerant pipes 3c to 3e and the fourth refrigerant pipes 4c to 4e extend into the relay unit B.

The third refrigerant pipe 3c connects the relay unit B to the indoor unit C. In the relay unit B, the third refrigerant pipe 3c branches into one end and the other end. The one end is connected to the third branch 33, and the other end is connected to the first branch 31. The third refrigerant pipe 3d connects the relay unit B to the indoor unit D. In the relay unit B, the third refrigerant pipe 3d branches into one end and the other end. The one end is connected to the third branch 33, and the other end is connected to the first branch 31. The third refrigerant pipe 3e connects the relay unit B to the supplementary heat source unit E. In the relay unit B, the third refrigerant pipe 3e branches into one end and the other end. The one end is connected to the third branch 33, and the other end is connected to the first branch 31.

The fourth refrigerant pipe 4c connects the second branch 32 in the relay unit B to the indoor unit C. The fourth refrigerant pipe 4d connects the second branch 32 in the relay unit B to the indoor unit D. The fourth refrigerant pipe 4e connects the second branch 32 in the relay unit B to the supplementary heat source unit E.

The first branch 31 is connected to the second refrigerant pipe 2 and the other ends of the third refrigerant pipes 3c to 3e. The second branch 32 is connected to the second bypass pipe 52, the third bypass pipe 53, and the fourth refrigerant pipes 4c to 4e. The third branch 33 is connected to the first refrigerant pipe 1, the second bypass pipe 52, and the one ends of the third refrigerant pipes 3c to 3e.

Each of the solenoid valves 41c to 41e and 42c to 42e changes a refrigerant flow state between the relay unit B and the corresponding one of the indoor units C and D and the supplementary heat source unit E. The solenoid valve 41c is disposed at the one end of the third refrigerant pipe 3c. Controlling open and closed states of the solenoid valve 41c switches between the presence and absence of flow of refrigerant in the third refrigerant pipe 3c, the third branch 33, and the first refrigerant pipe 1. The solenoid valve 41d is disposed at the one end of the third refrigerant pipe 3d. Controlling the open and closed states of the solenoid valve 41d switches between the presence and absence of flow of refrigerant in the third refrigerant pipe 3d, the third branch 33, and the first refrigerant pipe 1. The solenoid valve 41e is disposed at the one end of the third refrigerant pipe 3e. Controlling the open and closed states of the solenoid valve 41e switches between the presence and absence of flow of refrigerant in the third refrigerant pipe 3e, the third branch 33, and the first refrigerant pipe 1.

The solenoid valve 42c is disposed at the other end of the third refrigerant pipe 3c. Controlling the open and closed states of the solenoid valve 42c switches between the presence and absence of flow of refrigerant in the third refrigerant pipe 3c, the first branch 31, and the second refrigerant pipe 2. The solenoid valve 42d is disposed at the other end of the third refrigerant pipe 3d. Controlling the open and closed states of the solenoid valve 42d switches between the presence and absence of flow of refrigerant in the third refrigerant pipe 3d, the first branch 31, and the second refrigerant pipe 2. The solenoid valve 42e is disposed at the other end of the third refrigerant pipe 3e. Controlling the open and closed states of the solenoid valve 42e switches between the presence and absence of flow of refrigerant in the third refrigerant pipe 3e, the first branch 31, and the second refrigerant pipe 2.

The gas-liquid separator 51 is disposed at the second refrigerant pipe 2, and separates refrigerant flowing through the second refrigerant pipe 2 into gaseous phase refrigerant and liquid phase refrigerant. The gaseous phase refrigerant separated by the gas-liquid separator 51 flows to the first branch 31. The liquid phase refrigerant separated by the gas-liquid separator 51 flows to the second branch 32.

The second bypass pipe 52 is a pipe that connects the gas-liquid separator 51 to the second branch 32. The third bypass pipe 53 is a pipe that connects the second branch 32 to the third branch 33. The third flow rate control device 54 is disposed at the second bypass pipe 52 and is, for example, an electronic expansion valve having a variably controllable opening degree. The fourth flow rate control device 55 is disposed at the third bypass pipe 53 and is, for example, an electronic expansion valve having a variably controllable opening degree.

The first heat exchanger 56 exchanges heat between refrigerant flowing through a portion of the second bypass pipe 52 that is located between the gas-liquid separator 51 and the fourth flow rate control device 55 and refrigerant flowing through a portion of the third bypass pipe 53 that is located between the second heat exchanger 57 and the third branch 33. The second heat exchanger 57 exchanges heat between refrigerant flowing through a portion of the second bypass pipe 52 that is located between the third flow rate control device 54 and the second branch 32 and refrigerant flowing through a portion of the third bypass pipe 53 that is located between the fourth flow rate control device 55 and the first heat exchanger 56.

A flow switching valve, such as a check valve, may be provided for the second branch 32 such that refrigerant flowing from the indoor units C and D performing heating to the second branch 32 is caused to flow to the second heat exchanger 57. This ensures that single-phase liquid refrigerant flows upstream of the fourth flow rate control device 55. Thus, stable flow rate control can be achieved.

(Indoor Units C and D)

Each of the indoor units C and D is installed at a position where the indoor unit can supply conditioned air to an air-conditioning target space, such as an indoor space, and supplies cooling air or heating air to the air-conditioning target space by using cooling energy or heating energy supplied from the outdoor unit A via the relay unit B. The indoor unit C includes a fifth flow rate control device 61c, an indoor heat exchanger 62c, and an indoor fan 63c. Although detailed explanation of the indoor unit D is omitted, the indoor unit D also includes, similarly to the indoor unit C, a fifth flow rate control device 61d, an indoor heat exchanger 62d, and an indoor fan 63d. The configuration of each of these components is the same as the configuration of each of these components in the indoor unit C. Furthermore, each of the indoor units C and D is provided with a sensor (not illustrated) to measure an indoor temperature.

The fifth flow rate control device 61c is, for example, an electronic expansion valve having a variably controllable opening degree. The fifth flow rate control device 61c is disposed at a portion of the third refrigerant pipe 3c that is located between the second branch 32 in the relay unit B and the indoor heat exchanger 62c. The fifth flow rate control device 61c adjusts the flow rate of refrigerant that flows into the indoor heat exchanger 62c.

The indoor heat exchanger 62c exchanges heat between load side refrigerant flowing through the indoor unit C and air supplied from the indoor fan 63c, thereby producing heating air or cooling air to be supplied to the air-conditioning target space. The indoor heat exchanger 62c is, for example, an air-cooled indoor heat exchanger. The indoor heat exchanger 62c may be of any type other than the air-cooled type, for example, the water-cooled type, as long as the heat exchanger is configured to exchange heat between refrigerant and a fluid other than the refrigerant.

The indoor fan 63c is installed in proximity to the indoor heat exchanger 62c and controls the flow rate of air that exchanges heat with refrigerant. The indoor fan 63c is an exemplary flow rate control device that controls the flow rate of a fluid that exchanges heat with refrigerant. If the indoor heat exchanger 62c is of the water-cooled type, a pump that supplies water to the indoor heat exchanger 62c may be provided instead of the indoor fan 63c.

(Supplementary Heat Source Unit E)

The supplementary heat source unit E removes heat from a heat medium stored in, for example, a hot water tank F connected to, for example, a boiler, and supplies heating energy to the outdoor heat exchanger 12 in the outdoor unit A. This reduces or eliminates the formation of frost in the heating operation and also reduces the time required to perform a defrosting operation. The supplementary heat source unit E includes a fifth flow rate control device 61e, a water pipe 71, a water pump 72, and a supplementary heat exchanger 73. An air-conditioning system has a configuration in which the hot water tank F is added to the air-conditioning apparatus 100 including the outdoor unit A, the relay unit B, the indoor units C and D, and the supplementary heat source unit E.

The fifth flow rate control device 61e is, for example, an electronic expansion valve having a variably controllable opening degree. The fifth flow rate control device 61e is disposed at a portion of the third refrigerant pipe 3e that is located between the second branch 32 in the relay unit B and the supplementary heat exchanger 73. The fifth flow rate control device 61e adjusts the flow rate of refrigerant that flows into the supplementary heat exchanger 73.

The water pipe 71 is connected to an external pipe 99 connected to the hot water tank F disposed outside the air-conditioning apparatus 100, and supplies hot water to the supplementary heat exchanger 73. The hot water tank F is connected to, for example, a boiler (not illustrated) disposed outside the air-conditioning apparatus 100, and stores hot water heated by the boiler.

The water pump 72 is disposed at the water pipe 71 and delivers hot water to the supplementary heat exchanger 73. The supplementary heat exchanger 73 is, for example, a plate heat exchanger. The supplementary heat exchanger 73 exchanges heat between cooling energy refrigerant flowing from the outdoor unit A via the relay unit B and hot water supplied from the heat medium connected to the boiler, for example.

This heat exchange causes the cooling energy refrigerant flowing through the supplementary heat exchanger 73 to be heated into heating energy refrigerant. The heating energy refrigerant flows out from the supplementary heat exchanger 73.

(Controller 9)

The air-conditioning apparatus 100 includes the controllers 9. Each controller 9 is, for example, a microcomputer including a central processing unit (CPU) and a memory 9a. The controller 9 causes the CPU to execute programs stored in the memory 9a, thereby controlling the components of the air-conditioning apparatus 100. The controller 9 controls, for example, the actuators, on the basis of information including refrigerant pressure information, refrigerant temperature information, outdoor temperature information, and indoor temperature information detected by the sensors provided for the air-conditioning apparatus 100. For example, the controller 9 controls driving the compressor 10, switching the flow switching device 11, driving a fan motor of the outdoor fan 13, driving fan motors of the indoor fans 63c to 63e, the solenoid valves 41c to 41e and 42c to 42e, and the opening degrees of the flow rate control devices. The memory 9a stores, for example, functions to determine control values.

The controller 9 is disposed in each of the outdoor unit A and the relay unit B. The controllers 9 having the same configuration and functions communicate with each other to control the actuators. Although Embodiment 1 illustrates a case where the controllers 9 are arranged in the outdoor unit A and the relay unit B, the number of controllers 9 may be one or three or more. The controller 9 may be installed in the indoor unit C or D or the supplementary heat source unit E. The controller 9 may be installed as a separate unit in a place other than the outdoor unit A, the relay unit B, the indoor unit C and D, and the supplementary heat source unit E. The functions of the controller 9 may be implemented by a dedicated processing circuit, such as an analog circuit and a digital circuit.

(Operation Modes)

Operation actions in various operations performed by the air-conditioning apparatus 100 will be described below. The air-conditioning apparatus 100 has three operation modes: the cooling operation, the heating operation, and the defrosting operation. The cooling operation is an operation mode in which all of the indoor units C and D perform the cooling operation. The heating operation is an operation mode in which all of the indoor units C and D perform the heating operation. The defrosting operation is an operation mode in which an operation is performed when frost forms on the outdoor heat exchanger 12. As will be described in detail below, the heating operation in Embodiment 1 reduces or eliminates the formation of frost on the outdoor heat exchanger 12 even at low outdoor air temperatures. The defrosting operation in Embodiment 1 enables the outdoor heat exchanger 12 to be defrosted in a short period of time, for example, when frost forms on the outdoor heat exchanger 12 at an extremely low outdoor air temperature.

(Cooling Operation)

Figure 2:
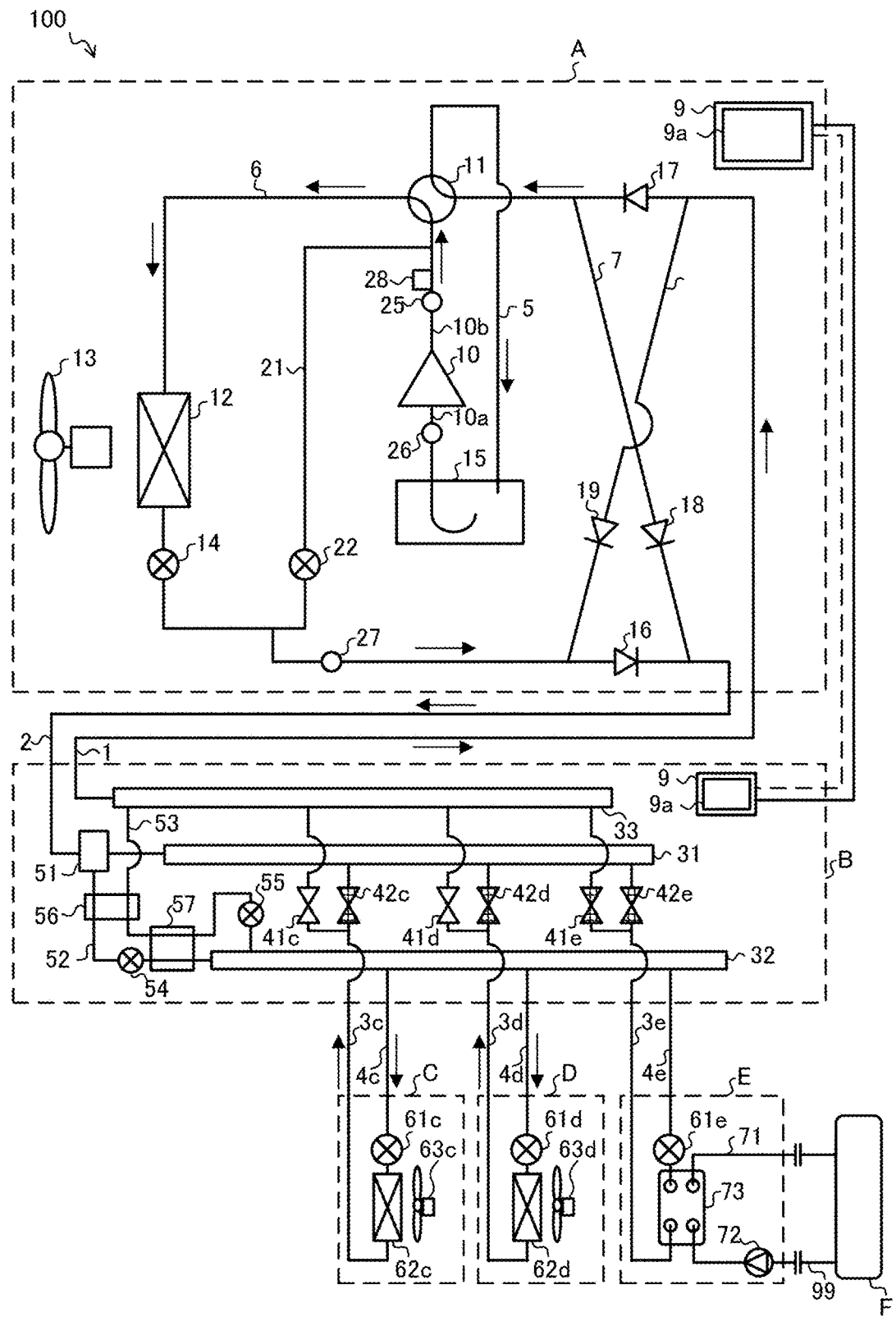
FIG. 2 is a diagram illustrating the flow of refrigerant in a cooling operation in Embodiment 1.

FIG. 2 is a diagram illustrating the flow of refrigerant in the cooling operation in Embodiment 1. In the following figures, including FIG. 2, illustrating the flow of refrigerant, the solenoid valves in a closed position are illustrated by hatching. In the cooling operation, refrigerant delivered from the compressor 10 in the outdoor unit A flows through the outdoor heat exchanger 12, passes in parallel through the indoor heat exchanger 62c in the indoor unit C and the indoor heat exchanger 62d in the indoor unit D, and again returns to the compressor 10 in the outdoor unit A. When the cooling operation is performed, the controllers 9 cause the flow switching device 11 to switch to a connection state in which, as illustrated in FIG. 2, the sixth refrigerant pipe 6 is connected to the discharge pipe 10b and the first refrigerant pipe 1 is connected to the fifth refrigerant pipe 5. Thus, the refrigerant discharged from the compressor 10 flows to the outdoor heat exchanger 12. The solenoid valves 41c and 41d are opened, and the solenoid valves 42c, 42d, 41e, and 42e are closed.

In this state, the operation of the compressor 10 is started. Low-temperature and low-pressure gaseous refrigerant is compressed into high-temperature and high-pressure gaseous refrigerant and is then discharged by the compressor 10. The high-temperature and high-pressure gaseous refrigerant discharged from the compressor 10 flows through the flow switching device 11 and flows into the outdoor heat exchanger 12. Once in the outdoor heat exchanger 12, the refrigerant is cooled while heating outdoor air, and thus turns into intermediate-temperature and high-pressure liquid refrigerant. The intermediate-temperature and high-pressure liquid refrigerant flowing out from the outdoor heat exchanger 12 passes through the second refrigerant pipe 2 and is then separated by the gas-liquid separator 51. The separated refrigerant exchanges heat with refrigerant flowing through the second bypass pipe 52 in the first heat exchanger 56, and then passes through the third flow rate control device 54. The refrigerant exchanges heat with the refrigerant flowing through the second bypass pipe 52 in the second heat exchanger 57, and is thus cooled.

The liquid refrigerant cooled through the first heat exchanger 56 and the second heat exchanger 57 flows into the second branch 32. Part of the refrigerant is diverted to the third bypass pipe 53, and the remaining refrigerant flows, as two streams, into the fourth refrigerant pipes 4c and 4d. The high-pressure liquid refrigerant streams flowing through the fourth refrigerant pipes 4c and 4d flow into the fifth flow rate control devices 61c and 61d in the indoor units C and D, respectively. The high-pressure liquid refrigerant streams are throttled by the fifth flow rate control devices 61c and 61d such that the refrigerant streams expand, decrease in pressure, and thus turn into a low-temperature and low-pressure two-phase gas-liquid state. The refrigerant streams through the fifth flow rate control devices 61c and 61d change under constant enthalpy. The refrigerant streams in the low-temperature and low-pressure two-phase gas-liquid state flowing out from the fifth flow rate control devices 61c and 61d flow into the indoor heat exchangers 62c and 62d, respectively. The refrigerant streams are heated while cooling indoor air, and thus turn into low-temperature and low-pressure gaseous refrigerant streams.

The low-temperature and low-pressure gaseous refrigerant streams flowing out from the indoor heat exchangers 62c and 62d pass through the respective solenoid valves 41c and 41d, and then flow into the third branch 33. The low-temperature and low-pressure gaseous refrigerant streams join together in the first branch 31. The refrigerant joins the low-temperature and low-pressure gaseous refrigerant heated through the first heat exchanger 56 and the second heat exchanger 57 in the third bypass pipe 53. Then, the refrigerant passes through the first refrigerant pipe 1 and the flow switching device 11 and flows into the compressor 10, where the refrigerant is compressed.

(Heating Operation)

Figure 3:
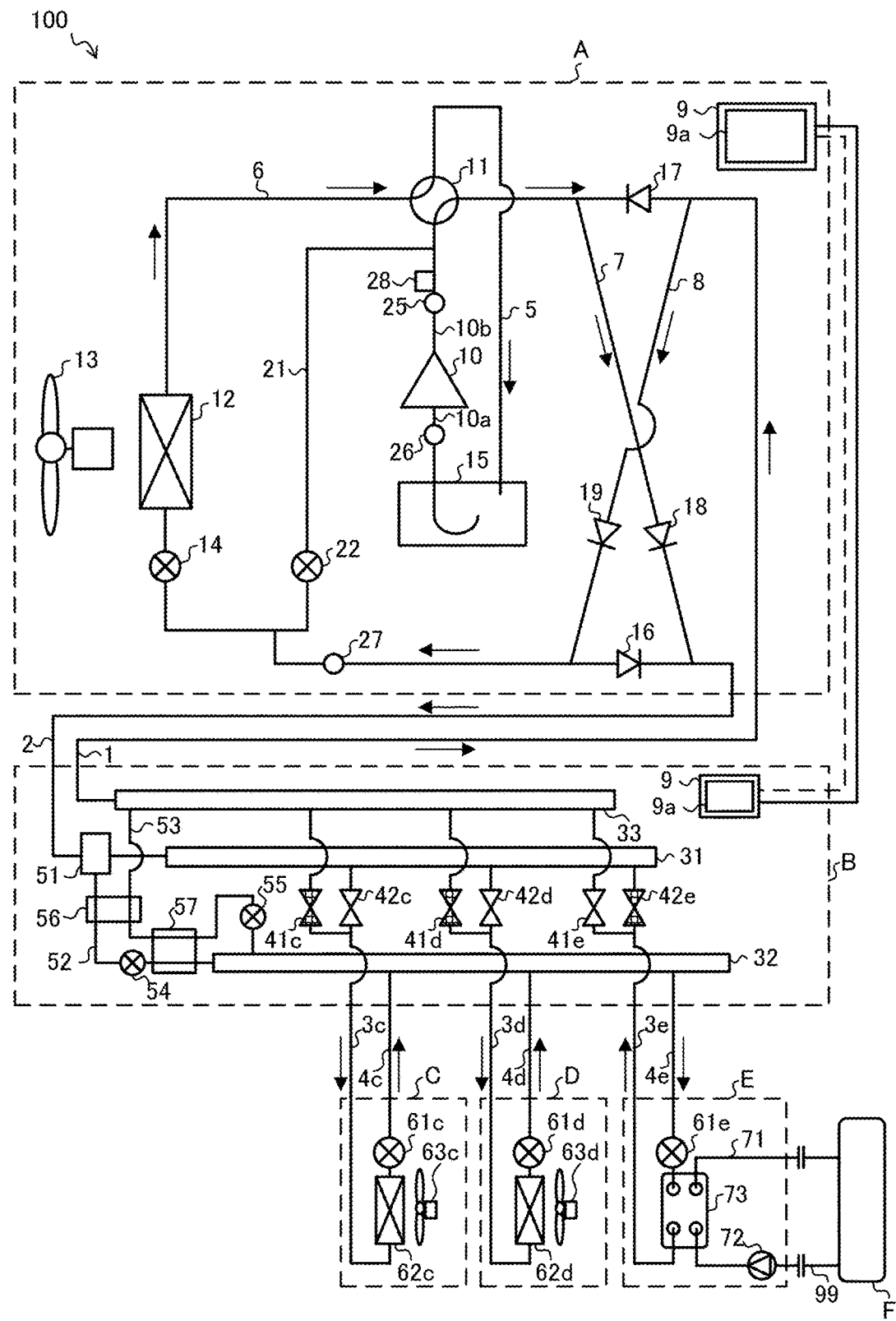
FIG. 3 is a circuit diagram illustrating the flow of refrigerant in a heating operation in Embodiment 1.

FIG. 3 is a circuit diagram illustrating the flow of refrigerant in the heating operation in Embodiment 1. In the heating operation, refrigerant delivered from the compressor 10 in the outdoor unit A flows through the indoor heat exchanger 62c in the indoor unit C and the indoor heat exchanger 62d in the indoor unit D and is then supplied to the outdoor heat exchanger 12 via the supplementary heat exchanger 73 in the supplementary heat source unit E. After that, the refrigerant again returns to the compressor 10 in the outdoor unit A. When the heating operation is performed, the controllers 9 cause the flow switching device 11 to switch to a connection state in which, as illustrated in FIG. 3, the first refrigerant pipe 1 is connected to the discharge pipe 10b and the fifth refrigerant pipe 5 is connected to the sixth refrigerant pipe 6. The solenoid valves 42c, 42d, and 41e are opened, and the solenoid valves 41c, 41d, and 42e are closed.

In this state, the operation of the compressor 10 is started. Low-temperature and low-pressure gaseous refrigerant is compressed into high-temperature and high-pressure gaseous refrigerant and is then discharged by the compressor 10. The high-temperature and high-pressure gaseous refrigerant discharged from the compressor 10 flows through the flow switching device 11 and the second refrigerant pipe 2 and flows into the first branch 31. The high-temperature and high-pressure gaseous refrigerant that has flowed into the first branch 31 is divided into two streams in the first branch 31. The refrigerant streams pass through the solenoid valves 42c and 42d and flow into the indoor heat exchangers 62c and 62d, respectively. The refrigerant streams are heated while cooling indoor air, and thus turn into intermediate-temperature and high-pressure liquid refrigerant streams.

The intermediate-temperature and high-pressure liquid refrigerant streams flowing out from the indoor heat exchangers 62c and 62d flow into the fifth flow rate control devices 61c and 61d and then join together in the second branch 32. After joined in the second branch 32, the intermediate-temperature and high-pressure liquid refrigerant partly flows into the fifth flow rate control device 61e in the supplementary heat source unit E. The intermediate-temperature and high-pressure liquid refrigerant is throttled by the fifth flow rate control device 61e such that the refrigerant expands, decreases in pressure, and turns into a low-temperature and low-pressure two-phase gas-liquid state.

The refrigerant in the low-temperature and low-pressure two-phase gas-liquid state flowing out from the fifth flow rate control device 61e flows into the supplementary heat exchanger 73, where the refrigerant exchanges heat with hot water. The refrigerant is heated by exchanging heat with the hot water and thus turns into high-temperature and low-pressure gaseous refrigerant. The high-temperature and low-pressure gaseous refrigerant flowing out from the supplementary heat exchanger 73 passes through the solenoid valve 41e and flows into the first refrigerant pipe 1.

The high-temperature and low-pressure single-phase gaseous refrigerant flowing through the first refrigerant pipe 1 flows into the outdoor heat exchanger 12. The refrigerant removes heat from outdoor air and thus turns into low-temperature and low-pressure gaseous refrigerant. The low-temperature and low-pressure gaseous refrigerant flowing out from the outdoor heat exchanger 12 passes through the flow switching device 11 and flows into the compressor 10, where the refrigerant is compressed.

In a typical heating operation at a low outdoor air temperature, the outdoor heat exchanger 12 in the outdoor unit A serves as an evaporator. If a heat transfer surface of the outdoor heat exchanger 12 is at or below zero degrees C., moisture in the air may condense and freeze to form frost on the outdoor heat exchanger 12. In the related art, to prevent frost from forming on the outdoor heat exchanger 12, the outdoor fan 13 is used to reduce or eliminate a reduction in evaporating temperature. However, the refrigerant flowing into the outdoor heat exchanger 12 is in a low-temperature and low-pressure state. This facilitates the formation of frost on the outdoor heat exchanger 12. The formation of frost on the outdoor heat exchanger 12 narrows air passages, resulting in a reduction in air flow rate. Thus, the frost further grows and reduces the amount of heat exchange, causing a reduction in heating capacity.

In contrast, in Embodiment 1, the refrigerant flowing out from the indoor heat exchangers 62c and 62d flows through the supplementary heat exchanger 73 such that the refrigerant turns into high-temperature and low-pressure refrigerant, which flows through the outdoor heat exchanger 12. Thus, the heat transfer surface of the outdoor heat exchanger 12 is maintained at or above zero degrees C. This reduces or eliminates the formation of frost on the outdoor heat exchanger 12.

(Defrosting Operation)

Figure 4:
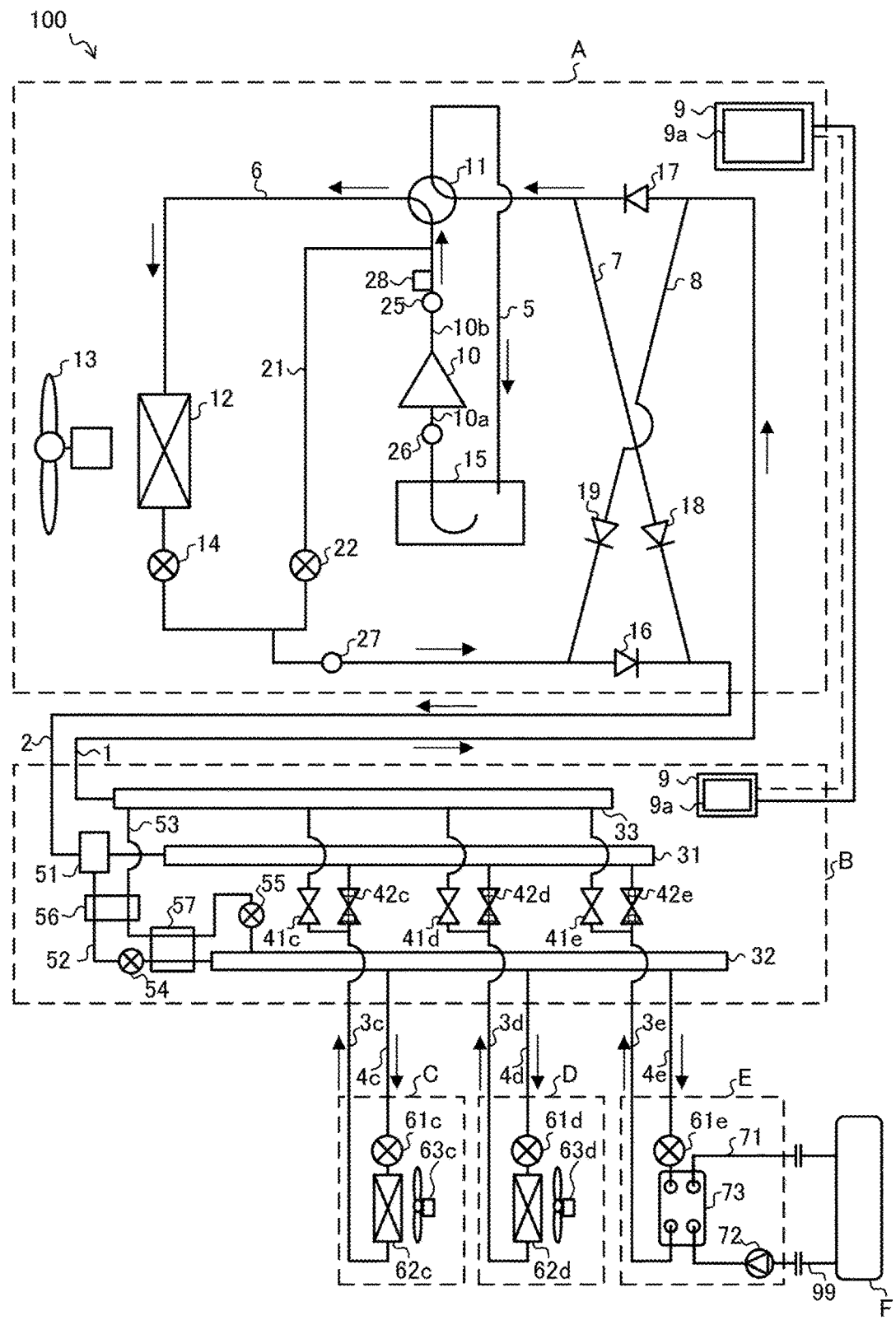
FIG. 4 is a circuit diagram illustrating the flow of refrigerant in a defrosting operation in Embodiment 1.

FIG. 4 is a circuit diagram illustrating the flow of refrigerant in the defrosting operation in Embodiment 1. In the defrosting operation, refrigerant delivered from the compressor 10 in the outdoor unit A flows through the outdoor heat exchanger 12, passes in parallel through the indoor heat exchanger 62c in the indoor unit C, the indoor heat exchanger 62d in the indoor unit D, and the supplementary heat exchanger 73 in the supplementary heat source unit E, and again returns to the compressor 10 in the outdoor unit A. When the defrosting operation is performed, the controllers 9 cause the flow switching device 11 to switch to the connection state in which, as illustrated in FIG. 4, the sixth refrigerant pipe 6 is connected to the discharge pipe 10b and the first refrigerant pipe 1 is connected to the fifth refrigerant pipe 5. Thus, the refrigerant discharged from the compressor 10 flows to the outdoor heat exchanger 12. The solenoid valves 41c, 41d, and 41e are opened, and the solenoid valves 42c, 42d, and 42e are closed.

In this state, the operation of the compressor 10 is started. Low-temperature and low-pressure gaseous refrigerant is compressed into high-temperature and high-pressure gaseous refrigerant and is then discharged by the compressor 10. The high-temperature and high-pressure gaseous refrigerant discharged from the compressor 10 flows through the flow switching device 11 and flows into the outdoor heat exchanger 12. Once in the outdoor heat exchanger 12, the refrigerant is cooled while heating outdoor air, and thus turns into intermediate-temperature and high-pressure liquid refrigerant. The intermediate-temperature and high-pressure liquid refrigerant flowing out from the outdoor heat exchanger 12 passes through the second refrigerant pipe 2 and is then separated by the gas-liquid separator 51. The separated refrigerant exchanges heat with refrigerant flowing through the third bypass pipe 53 in the first heat exchanger 56, and then passes through the third flow rate control device 54. The refrigerant exchanges heat with the refrigerant flowing through the third bypass pipe 53 in the second heat exchanger 57, and is thus cooled.

The liquid refrigerant cooled through the first heat exchanger 56 and the second heat exchanger 57 flows into the second branch 32. Part of the refrigerant is diverted to the second bypass pipe 52, and the remaining refrigerant flows, as three streams, into the fourth refrigerant pipes 4c to 4e. The high-pressure liquid refrigerant streams flowing through the fourth refrigerant pipes 4c to 4e flow into the respective fifth flow rate control devices 61c to 61e. The high-pressure liquid refrigerant streams are throttled by the fifth flow rate control devices 61c to 61e such that the refrigerant streams expand, decrease in pressure, and turn into a low-temperature and low-pressure two-phase gas-liquid state. The refrigerant streams through the fifth flow rate control devices 61c to 61e change under constant enthalpy.

In the indoor units C and D, the refrigerant streams in the low-temperature and low-pressure two-phase gas-liquid state having flowed through the fifth flow rate control devices 61c and 61d flow into the indoor heat exchangers 62c and 62d, respectively. The refrigerant streams are heated, and thus turn into low-temperature and low-pressure gaseous refrigerant streams. In the supplementary heat source unit E, the refrigerant stream in the low-temperature and low-pressure two-phase gas-liquid state having flowed through the fifth flow rate control device 61e flows into the supplementary heat exchanger 73. The refrigerant stream is heated while exchanging heat with hot water through the supplementary heat exchanger 73, and thus turns into a high-temperature and low-pressure gaseous refrigerant stream.

The refrigerant streams having flowed through the indoor heat exchangers 62c and 62d and the supplementary heat exchanger 73 pass through the respective solenoid valves 41c, 41d, and 41e, and then flow into the third branch 33. To cause the refrigerant streams flowing into the third branch 33 to be high-temperature and low-pressure gaseous refrigerant, the fifth flow rate control devices 61c to 61e adjust the flow rate of refrigerant that flows to the indoor heat exchangers 62c and 62d and the supplementary heat exchanger 73. The high-temperature and low-pressure gaseous refrigerant streams join together in the third branch 33. The refrigerant joins low-temperature and low-pressure gaseous refrigerant heated through the first heat exchanger 56 and the second heat exchanger 57 in the third bypass pipe 53. Then, the refrigerant passes through the first refrigerant pipe 1 and the flow switching device 11 and flows into the compressor 10, where the refrigerant is compressed.

In the related art, refrigerant returning to the outdoor unit A is in a low-temperature and low-pressure two-phase gas-liquid state. In contrast, in Embodiment 1, the refrigerant returning to the outdoor unit A exchanges heat with hot water heated by, for example, a boiler, in the supplementary heat exchanger 73. Therefore, the refrigerant returning to the outdoor unit A removes heat from the hot water and thus turns into high-temperature and low-pressure gaseous refrigerant.

In the heating operation, the refrigerant heated to a high temperature through the supplementary heat exchanger 73 is supplied to the outdoor heat exchanger 12 in the outdoor unit A in Embodiment 1. Therefore, the air-conditioning apparatus 100 can reduce or eliminate the formation of frost on the outdoor heat exchanger in the heating operation.

In Embodiment 1, during the heating operation, the refrigerant caused to turn into the high-temperature and low-pressure state by the supplementary heat source unit E flows through the outdoor heat exchanger 12 in the outdoor unit A. This causes the heat transfer surface of the outdoor heat exchanger 12 to be maintained at or above 0 degrees C., thus reducing or eliminating the formation of frost on the outdoor heat exchanger 12. Therefore, the air-conditioning apparatus 100 can continue the heating operation even at low outdoor air temperatures. Furthermore, the refrigerant discharged from the compressor 10 is not used for defrosting, and can be supplied to the indoor heat exchangers 62c and 62d. This reduces or eliminates a reduction in heating capacity.

In Embodiment 1, during the defrosting operation, the refrigerant returning to the outdoor unit A is in the high-temperature and low-pressure gaseous state. Since the high-temperature and low-pressure gaseous refrigerant is supplied to the compressor 10, the refrigerant at a higher temperature and a higher pressure than in the related art is discharged from the compressor 10 and is supplied to the outdoor heat exchanger 12. Therefore, the air-conditioning apparatus 100 has improved defrosting capacity, thus reducing the time required for the defrosting operation.

Embodiment 2

Figure 5:
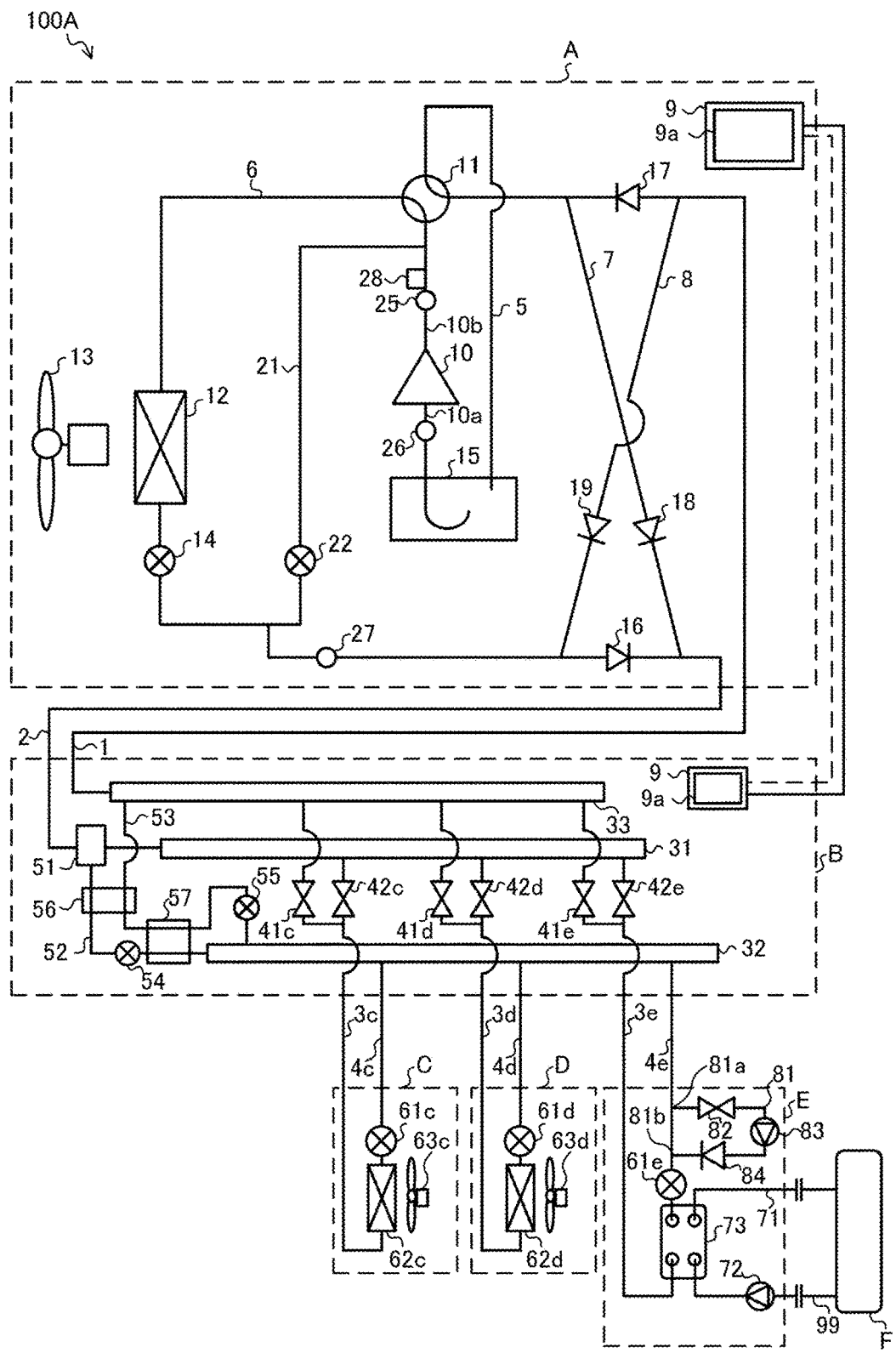
FIG. 5 is a circuit diagram illustrating an air-conditioning apparatus 100A according to Embodiment 2.

FIG. 5 is a circuit diagram illustrating an air-conditioning apparatus 100A according to Embodiment 2. The configuration of the supplementary heat source unit E of the air-conditioning apparatus 100A according to Embodiment 2 differs from the configuration of its equivalent in Embodiment 1. The configurations of the outdoor unit A, the relay unit B, and the indoor units C and D of the air-conditioning apparatus 100A are the same as the configurations of their equivalents in Embodiment 1.

The supplementary heat source unit E includes, in addition to the components described in Embodiment 1, a pump pipe 81, a solenoid valve 82, a refrigerant pump 83, and a check valve 84. The pump pipe 81 is connected to a portion of the fourth refrigerant pipe 4e that is located between the second branch 32 in the relay unit B and the fifth flow rate control device 61e. An inlet 81a of the pump pipe 81 is located closer to the relay unit B than is an outlet 81b of the pump pipe 81.

The solenoid valve 82 is disposed at a portion of the pump pipe 81 that is located between the inlet 81a and the refrigerant pump 83. Controlling the open and closed states of the solenoid valve 82 switches between the presence and absence of flow of refrigerant from the fourth refrigerant pipe 4e to the pump pipe 81. The refrigerant pump 83 is disposed at a portion of the pump pipe 81 that is located between the solenoid valve 82 and the check valve 84. The refrigerant pump 83 delivers the refrigerant flowing through the pump pipe 81 to the check valve 84. The refrigerant pump 83 does not compress the refrigerant. The check valve 84 is disposed at a portion of the pump pipe 81 that is located between the refrigerant pump 83 and the outlet 81b. The check valve 84 permits the refrigerant to flow only in a direction from the refrigerant pump 83 to the outlet 81b of the pump pipe 81.

The air-conditioning apparatus 100A according to Embodiment 2 has multiple operation modes: the cooling operation, the heating operation, and the defrosting operation. The air-conditioning apparatus 100A according to Embodiment 2 can perform the heating operation such that the refrigerant pump 83 is driven and the compressor 10 in the outdoor unit A is stopped. Such a heating operation in which the refrigerant pump 83 is driven will be referred to as a pump heating operation. For convenience of explanation, a heating operation that is not the pump heating operation will be referred to as a normal heating operation. The controllers 9 perform the normal heating operation when a heating load is greater than or equal to a predetermined threshold, and perform the pump heating operation when the heating load is less than the threshold. The heating load is estimated on the basis of, for example, refrigerant pressure information, refrigerant temperature information, outdoor temperature information, and indoor temperature information detected by sensors provided for the air-conditioning apparatus 100.

To perform the pump heating operation, the solenoid valves 42c, 42d, and 42e in the relay unit B and the solenoid valve 82 in the supplementary heat source unit E are opened, and the solenoid valves 41c, 41d, and 41e in the relay unit B are closed. Thus, part of refrigerant flowing through the fourth refrigerant pipe 4 is drawn into the pump pipe 81 and is then delivered by the refrigerant pump 83. To perform the normal heating operation, the solenoid valves 42c, 42d, and 41e in the relay unit B are opened, and the solenoid valves 41c, 41d, and 42e in the relay unit B and the solenoid valve 82 in the supplementary heat source unit E are closed. Thus, the whole of the refrigerant flowing through the fourth refrigerant pipe 4e flows to the fifth flow rate control device 61e without flowing via the pump pipe 81. The flow of refrigerant in the pump heating operation will be described below. The flows of refrigerant in the cooling operation, the defrosting operation, and the normal heating operation are the same as the flows of their equivalents in Embodiment 1, and the explanation of the flows is omitted.

(Pump Heating Operation)

Figure 6:
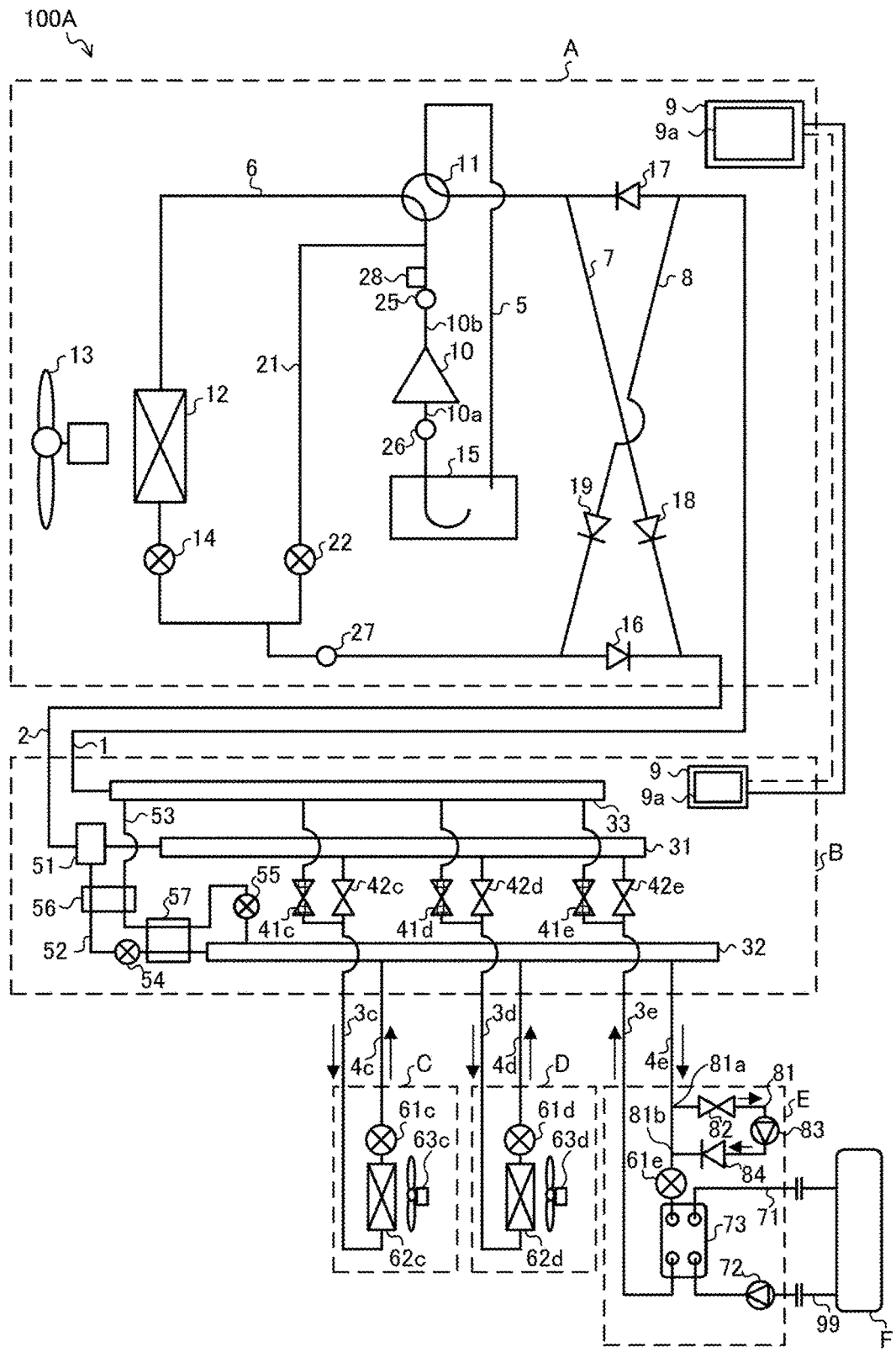
FIG. 6 is a diagram illustrating the flow of refrigerant in a pump heating operation in Embodiment 2.

FIG. 6 is a diagram illustrating the flow of refrigerant in the pump heating operation in Embodiment 2. In the pump heating operation, the refrigerant having flowed through the indoor heat exchanger 62c in the indoor unit C and the indoor heat exchanger 62d in the indoor unit D flows through the supplementary heat exchanger 73 and the refrigerant pump 83 in the supplementary heat source unit E and again flows through the indoor heat exchanger 62c in the indoor unit C and the indoor heat exchanger 62d in the indoor unit D. When the pump heating operation is performed, the controllers 9 stop the operation of the compressor 10. As illustrated in FIG. 6, the controllers 9 open the solenoid valves 42c, 42d, and 42e in the relay unit B and the solenoid valve 82 in the supplementary heat source unit E, and close the solenoid valves 41c, 41d, and 41e in the relay unit B.

In this state, the operation of the refrigerant pump 83 is started. Part of liquid refrigerant flowing through the fourth refrigerant pipe 4e is drawn into the pump pipe 81 and is then delivered by the refrigerant pump 83. The liquid refrigerant delivered from the refrigerant pump 83 passes through the check valve 96 and joins the liquid refrigerant flowing through the fourth refrigerant pipe 4. The refrigerant then flows into the supplementary heat exchanger 73. The refrigerant is heated while exchanging heat with hot water through the supplementary heat exchanger 73, and thus turns into high-temperature and intermediate-pressure refrigerant.

The refrigerant flowing out from the supplementary heat exchanger 73 passes through the solenoid valve 42e and then flows into the first branch 31. The refrigerant that has flowed into the first branch 31 passes through the solenoid valves 42c and 42d and then flows into the indoor units C and D. The high-temperature and intermediate-pressure refrigerant that has flowed into the indoor units C and D is cooled in the indoor heat exchangers 62c and 62d while heating indoor air, and thus turns into intermediate-temperature and intermediate-pressure liquid refrigerant.

The intermediate-temperature and intermediate-pressure liquid refrigerant flowing out from the indoor heat exchangers 62c and 62d passes through the fifth flow rate control devices 61c and 61d and then flows into the second branch 32. The refrigerant that has flowed into the second branch 32 again flows into the fourth refrigerant pipe 4e in the supplementary heat source unit E, and is circulated.

Also in Embodiment 2, during the normal heating operation, the refrigerant heated to a high temperature through the supplementary heat exchanger 73 is supplied to the outdoor heat exchanger 12 in the outdoor unit A. Therefore, the air-conditioning apparatus 100A can reduce or eliminate the formation of frost on the outdoor heat exchanger in the heating operation.

In Embodiment 2, the supplementary heat exchanger 73 exchanges heat between the refrigerant flowing through the supplementary heat source unit E and the hot water heated by, for example, a boiler, thus heating the refrigerant to a high temperature. In addition, performing the pump heating operation, in which the refrigerant pump 83 is used to circulate the refrigerant between the supplementary heat source unit E and the indoor units C and D, enables the heating operation to be performed without operating the compressor 10 in the outdoor unit A.

Since the operation of the compressor 10 in the outdoor unit A is stopped in the pump heating operation, low-temperature refrigerant does not flow through the outdoor heat exchanger 12. Thus, the air-conditioning apparatus 100A can reduce or eliminate the formation of frost on the outdoor heat exchanger 12 while continuing the heating operation.

Embodiment 3

Figure 7:
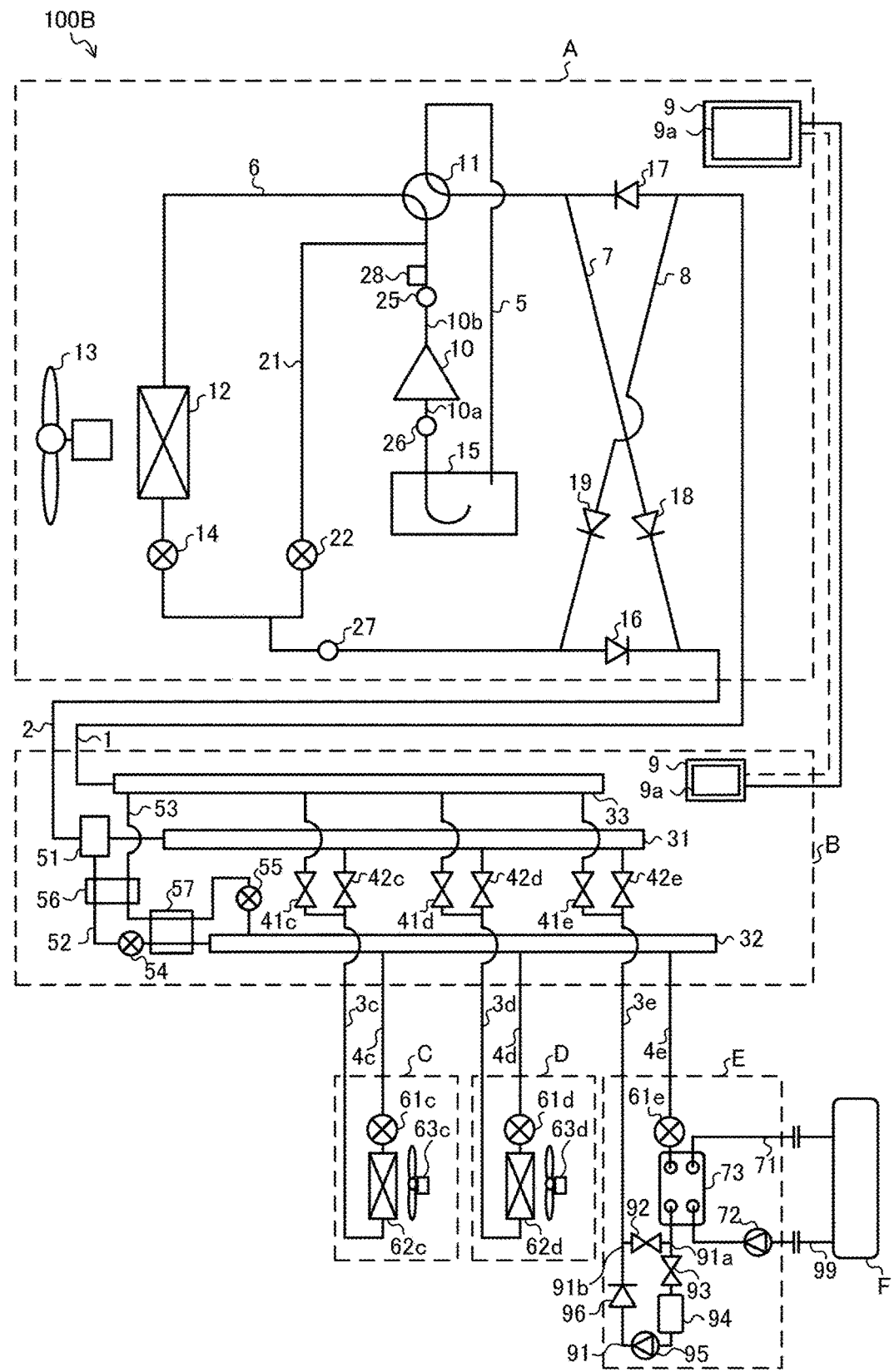
FIG. 7 is a circuit diagram illustrating an air-conditioning apparatus 100B according to Embodiment 3.

FIG. 7 is a circuit diagram illustrating an air-conditioning apparatus 100B according to Embodiment 3. The configuration of the supplementary heat source unit E of the air-conditioning apparatus 100A according to Embodiment 3 differs from the configuration of its equivalent in Embodiment 1. The configurations of the outdoor unit A, the relay unit B, and the indoor units C and D of the air-conditioning apparatus 100B are the same as the configurations of their equivalents in Embodiment 1.

The supplementary heat source unit E includes, in addition to the components described in Embodiment 1, a supplementary compressor pipe 91, a solenoid valve 92, a solenoid valve 93, a supplementary accumulator 94, a supplementary compressor 95, and a check valve 96. The supplementary compressor pipe 91 is connected to a portion of the third refrigerant pipe 3e that is located between the supplementary heat exchanger 73 and the solenoid valves 41e and 42e in the relay unit B. An inlet 91a of the supplementary compressor pipe 91 is located closer to the supplementary heat exchanger 73 than is an outlet 91b of the supplementary compressor pipe 91.

The solenoid valve 92 is disposed between a portion of the third refrigerant pipe 3e that is connected to the inlet 91a of the supplementary compressor pipe 91 and a portion of the third refrigerant pipe 3e that is connected to the outlet 91b. Controlling the open and closed states of the solenoid valve 92 changes a flow passage of refrigerant flowing out from the supplementary heat exchanger 73. The solenoid valve 93 is disposed at a portion of the supplementary compressor pipe 91 that is located between the inlet 91a and the supplementary accumulator 94. Controlling the open and closed states of the solenoid valve 93 switches between the presence and absence of flow of refrigerant from the supplementary heat exchanger 73 to the supplementary compressor pipe 91. The supplementary accumulator 94 is disposed at a portion of the supplementary compressor pipe 91 that is located between the solenoid valve 93 and the supplementary compressor 95, in other words, on a suction side of the supplementary compressor 95. The supplementary accumulator 94 accumulates an excess of refrigerant that is generated because of the difference between the amount of refrigerant circulated in the heating operation and the amount of refrigerant circulated in the cooling operation or an excess of refrigerant that is generated during transition from an operation to another operation.

The supplementary compressor 95 sucks refrigerant flowing through the supplementary heat source unit E and compresses the refrigerant into a high-temperature and high-pressure state. The supplementary compressor 95 is, for example, a capacity-controllable inverter compressor. The check valve 96 is disposed at a portion of the supplementary compressor pipe 91 that is located between the supplementary compressor 95 and the outlet 91b. The check valve 96 permits the refrigerant to flow only in a direction from the supplementary compressor 95 to the outlet 91b.

The air-conditioning apparatus 100B according to Embodiment 3 has multiple operation modes: the cooling operation, the heating operation, and the defrosting operation. The air-conditioning apparatus 100B according to Embodiment 3 can perform the heating operation such that the supplementary compressor 95 is driven and the compressor 10 in the outdoor unit A is stopped. Such a heating operation in which the supplementary compressor 95 is driven will be referred to as a supplementary heating operation. For convenience of explanation, a heating operation that is not the supplementary heating operation will be referred to as a normal heating operation. The controllers 9 perform the normal heating operation when a heating load is greater than or equal to a predetermined threshold, and perform the supplementary heating operation when the heating load is less than the threshold. The heating load is estimated on the basis of, for example, refrigerant pressure information, refrigerant temperature information, outdoor temperature information, and indoor temperature information detected by sensors provided for the air-conditioning apparatus 100.

To perform the supplementary heating operation, the solenoid valves 42c, 42d, and 42e in the relay unit B and the solenoid valve 93 in the supplementary heat source unit E are opened, and the solenoid valves 41c, 41d, and 41e in the relay unit B and the solenoid valve 92 in the supplementary heat source unit E are closed. Thus, during the supplementary heating operation, the refrigerant flowing out from the supplementary heat exchanger 73 passes through the supplementary compressor pipe 91 and flows to the relay unit B. To perform the normal heating operation, the solenoid valves 42c, 42d, and 41e in the relay unit B and the solenoid valve 92 in the supplementary heat source unit E are opened, and the solenoid valves 41c, 41d, and 42e in the relay unit B and the solenoid valve 93 in the supplementary heat source unit E are closed. Thus, during the normal heating operation, the refrigerant flowing out from the supplementary heat exchanger 73 flows to the relay unit B without flowing via the supplementary compressor pipe 91. The flow of refrigerant in the supplementary heating operation will be described below. The flows of refrigerant in the cooling operation, the defrosting operation, and the normal heating operation are the same as the flows of their equivalents in Embodiment 1, and the explanation of the flows is omitted.

(Supplementary Heating Operation)

Figure 8:
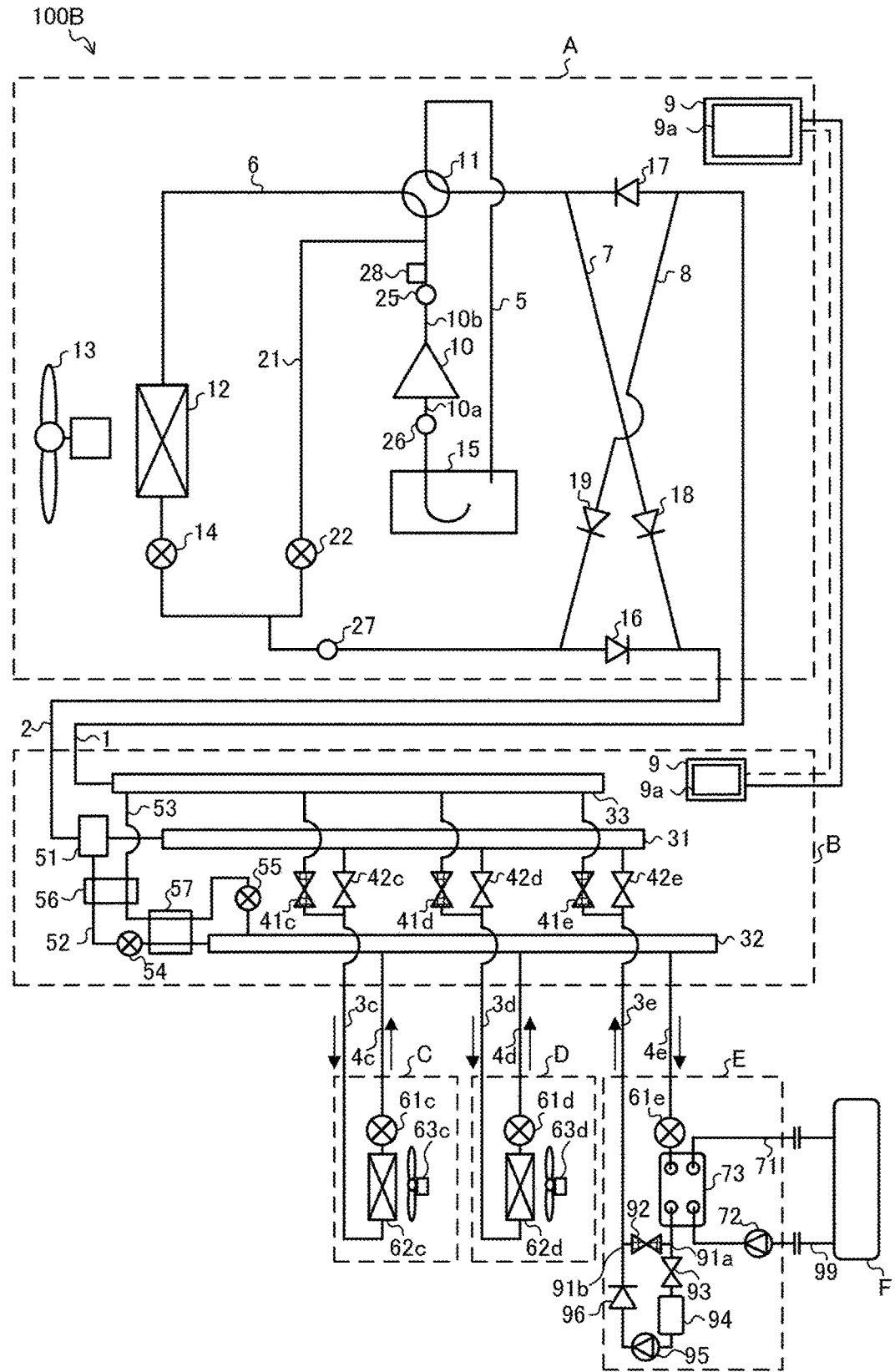
FIG. 8 is a diagram illustrating the flow of refrigerant in a supplementary heating operation in Embodiment 3.

FIG. 8 is a diagram illustrating the flow of refrigerant in the supplementary heating operation in Embodiment 3. In the supplementary heating operation, refrigerant having flowed through the indoor heat exchanger 62c in the indoor unit C and the indoor heat exchanger 62d in the indoor unit D flows through the supplementary heat exchanger 73 and the supplementary compressor 95 in the supplementary heat source unit E and again flows through the indoor heat exchanger 62c in the indoor unit C and the indoor heat exchanger 62d in the indoor unit D. To perform the pump heating operation, the controllers 9 stop the operation of the compressor 10. As illustrated in FIG. 6, the controllers 9 open the solenoid valves 42c, 42d, and 42e in the relay unit B and the solenoid valve 93 in the supplementary heat source unit E, and close the solenoid valves 41c, 41d, and 41e in the relay unit B and the solenoid valve 92 in the supplementary heat source unit E.

In this state, the operation of the supplementary compressor 95 is started. Liquid refrigerant flowing out from the supplementary heat exchanger 73 and flowing through the third refrigerant pipe 3e passes through the solenoid valve 93 and the supplementary accumulator 94 and is then sucked into the supplementary compressor 95. The refrigerant is compressed into a high-temperature and high-pressure gaseous state by the supplementary compressor 95, passes through the check valve 96, and again flows through the third refrigerant pipe 3e. The high-temperature and high-pressure refrigerant flowing through the third refrigerant pipe 3e flows into the first branch 31.

The refrigerant that has flowed into the first branch 31 passes through the solenoid valves 42c and 42d and flows into the indoor units C and D. The high-temperature and high-pressure refrigerant that has flowed into the indoor units C and D is cooled while heating indoor air through the indoor heat exchangers 62c and 62d, and thus turns into intermediate-temperature and intermediate-pressure liquid refrigerant.

The intermediate-temperature and intermediate-pressure liquid refrigerant flowing out from the indoor heat exchangers 62c and 62d passes through the fifth flow rate control devices 61c and 61d and then flows into the second branch 32. The intermediate-temperature and intermediate-pressure refrigerant that has flowed into the second branch 32 again flows into the fourth refrigerant pipe 4e in the supplementary heat source unit E, and is circulated.

The intermediate-temperature and intermediate-pressure refrigerant that has flowed into the fourth refrigerant pipe 4e is throttled by the fifth flow rate control device 61e such that the refrigerant expands, decreases in pressure, and turns into a low-temperature and low-pressure two-phase gas-liquid state. Then, the refrigerant is heated while exchanging heat with hot water through the supplementary heat exchanger 73, and thus turns into high-temperature and low-pressure gaseous refrigerant. The refrigerant flows into the supplementary accumulator 94 via the solenoid valve 93, and is circulated.

Also in Embodiment 3, during the normal heating operation, refrigerant heated to a high temperature through the supplementary heat exchanger 73 is supplied to the outdoor heat exchanger 12 in the outdoor unit A. Therefore, the air-conditioning apparatus 100B can reduce or eliminate the formation of frost on the outdoor heat exchanger in the heating operation.

In Embodiment 3, the supplementary heat exchanger 73 exchanges heat between the refrigerant flowing through the supplementary heat source unit E and hot water heated by, for example, a boiler, thus heating the refrigerant to a high temperature. In addition, performing the supplementary heating operation, in which the supplementary compressor 95 is used to circulate the refrigerant between the supplementary heat source unit E and the indoor units C and D, enables the heating operation to be performed without operating the compressor 10 in the outdoor unit A.

Since the operation of the compressor 10 in the outdoor unit A is stopped during the supplementary heating operation, low-temperature refrigerant does not flow through the outdoor heat exchanger 12. Thus, the air-conditioning apparatus 100B can reduce or eliminate the formation of frost on the outdoor heat exchanger 12 while continuing the heating operation.

In the supplementary heating operation, the supplementary compressor 95 causes the refrigerant to turn into a high-temperature and high-pressure state. This achieves higher heating capacity than heating capacity in the case where the refrigerant is circulated by using a pump.

The embodiments have been described above. The configuration in each embodiment can be modified within the spirit and scope of the embodiment. For example, the pump pipe 81 in Embodiment 2 may be disposed at the third refrigerant pipe 3e rather than the portion of the fourth refrigerant pipe 4e located between the second branch 32 in the relay unit B and the fifth flow rate control device 61e. Furthermore, the refrigerant pump 83 in Embodiment 2 or the supplementary compressor 95 in Embodiment 3 may be used simultaneously with the compressor 10 in the outdoor unit A to supplement the function of the compressor 10 in the normal heating operation.

Embodiment 3 may be combined with Embodiment 2. In other words, the supplementary heat source unit E may include, in addition to the components described in Embodiment 2, the supplementary compressor pipe 91, the solenoid valve 92, the solenoid valve 93, the supplementary accumulator 94, the supplementary compressor 95, and the check valve 96.

In each embodiment, the air-conditioning apparatus may perform a cooling and heating mixed operation in which one of the indoor units C and D performs the heating operation and the other one of them performs the cooling operation. In this case, the controlled states of the flow switching device 11 and the solenoid valves are not limited to the controlled states described in the above-described embodiments. The connection state may be appropriately switched to the other connection state depending on, for example, an air conditioning load on each indoor unit and heating energy supplied from the supplementary heat source unit E.

The invention claimed is:

1. An air-conditioning apparatus that includes an outdoor unit including a compressor configured to compress refrigerant, a relay unit connected to the outdoor unit, and an indoor unit connected to the relay unit, the compressor being driven to circulate the refrigerant between the outdoor unit, the relay unit, and the indoor unit, the air-conditioning apparatus comprising
   a supplementary heat source unit in parallel with the indoor unit and connected to the relay unit; and
   a controller,
   the outdoor unit including
      an outdoor heat exchanger configured to exchange heat between the refrigerant flowing through the outdoor heat exchanger and fluid, and
      a flow switching valve configured to switch between passages for the refrigerant,
   the supplementary heat source unit including a supplementary heat exchanger configured to exchange heat between the refrigerant flowing through the supplementary heat exchanger and water, and heat the refrigerant,
   the relay unit including multiple valves configured to switch between presence and absence of flow of the refrigerant in the relay unit, the indoor unit, and the supplementary heat source unit,
   the indoor unit including an indoor heat exchanger configured to exchange heat between the refrigerant flowing through the indoor heat exchanger and fluid,
   the controller being configured to control the flow switching valve and the multiple valves depending on an operation mode,
   the controller being configured to perform a heating operation by switching the flow switching valve to a state that causes a discharge side of the compressor to be connected to the relay unit and switching the multiple valves to a state that causes the refrigerant discharged from the compressor to flow through the indoor heat exchanger and causes the refrigerant having flowed through the indoor heat exchanger to be supplied to the outdoor heat exchanger via the supplementary heat exchanger.

2. The air-conditioning apparatus of claim 1,
   wherein the relay unit is connected to the outdoor unit by a first refrigerant pipe through which low-pressure refrigerant flows and a second refrigerant pipe through which high-pressure refrigerant flows,
   wherein the relay unit is connected to the indoor unit and the supplementary heat source unit by multiple third refrigerant pipes branching off from the first refrigerant pipe and multiple fourth refrigerant pipes branching off from the second refrigerant pipe,
   wherein each of the multiple third refrigerant pipes branches into one end and an other end in the relay unit, the one end is connected to the first refrigerant pipe, and the other end is connected to the second refrigerant pipe, and
   wherein the multiple valves are each disposed at a corresponding one of the one ends and the other ends of the multiple third refrigerant pipes.

3. The air-conditioning apparatus of claim 2,
   wherein the supplementary heat source unit further includes
      a pump pipe connected to at least one third refrigerant pipe of the multiple third refrigerant pipes or at least one fourth refrigerant pipe of the multiple fourth refrigerant pipes, and
      a refrigerant pump disposed at the pump pipe and configured to deliver the refrigerant, and
   wherein the controller is configured to perform a pump heating operation by stopping the compressor in the outdoor unit, driving the refrigerant pump, and switching the multiple valves to a state that causes the refrigerant having flowed through the indoor heat exchanger to return to the indoor heat exchanger via the supplementary heat exchanger and the refrigerant pump.

4. The air-conditioning apparatus of claim 2,
   wherein the supplementary heat source unit further includes
      a supplementary compressor pipe connected to at least one third refrigerant pipe of the multiple third refrigerant pipes or at least one fourth refrigerant pipe of the multiple fourth refrigerant pipes, and
      a supplementary compressor disposed at the supplementary compressor pipe and configured to compress the refrigerant, and
   wherein the controller is configured to perform a supplementary heating operation by stopping the compressor in the outdoor unit, driving the supplementary compressor, and switching the multiple valves to a state that causes the refrigerant having flowed through the indoor heat exchanger to return to the indoor heat exchanger via the supplementary heat exchanger and the supplementary compressor.

5. An air-conditioning system comprising:
   the air-conditioning apparatus of claim 1; and
   a hot water tank configured to heat water and to supply water that is heated to the supplementary heat exchanger.

6. An air-conditioning apparatus that includes an outdoor unit including a compressor configured to compress refrigerant, a relay unit connected to the outdoor unit, and an indoor unit connected to the relay unit, the compressor being driven to circulate the refrigerant between the outdoor unit, the relay unit, and the indoor unit, the air-conditioning apparatus comprising
   a supplementary heat source unit in parallel with the indoor unit and connected to the relay unit; and a controller, the outdoor unit including
- an outdoor heat exchanger configured to exchange heat between the refrigerant flowing through the outdoor heat exchanger and fluid, and
- a flow switching valve configured to switch between passages for the refrigerant, the supplementary heat source unit including a supplementary heat exchanger configured to exchange heat between the refrigerant flowing through the supplementary heat exchanger and water, and heat the refrigerant, the relay unit including multiple valves configured to switch between presence and absence of flow of the refrigerant in the relay unit, the indoor unit, and the supplementary heat source unit, the indoor unit including an indoor heat exchanger configured to exchange heat between the refrigerant flowing through the indoor heat exchanger and fluid, the controller being configured to control the flow switching valve and the multiple valves depending on an operation mode, the controller being configured to perform a defrosting operation by switching the flow switching valve to a state that causes a discharge side of the compressor to be connected to the outdoor heat exchanger and switching the multiple valves to a state that causes the refrigerant delivered from the compressor to flow through the outdoor heat exchanger, pass in parallel through the indoor heat exchanger and the supplementary heat source unit, and return to the compressor.

7. The air-conditioning apparatus of claim 6,
wherein the relay unit is connected to the outdoor unit by a first refrigerant pipe through which low-pressure refrigerant flows and a second refrigerant pipe through which high-pressure refrigerant flows,
wherein the relay unit is connected to the indoor unit and the supplementary heat source unit by multiple third refrigerant pipes branching off from the first refrigerant pipe and multiple fourth refrigerant pipes branching off from the second refrigerant pipe,
wherein each of the multiple third refrigerant pipes branches into one end and an other end in the relay unit, the one end is connected to the first refrigerant pipe, and the other end is connected to the second refrigerant pipe, and
wherein the multiple valves are each disposed at a corresponding one of the one ends and the other ends of the multiple third refrigerant pipes.

8. The air-conditioning apparatus of claim 7,
wherein the supplementary heat source unit further includes
- a pump pipe connected to at least one third refrigerant pipe of the multiple third refrigerant pipes or at least one fourth refrigerant pipe of the multiple fourth refrigerant pipes, and
- a refrigerant pump disposed at the pump pipe and configured to deliver the refrigerant, and wherein the controller is configured to perform a pump heating operation by stopping the compressor in the outdoor unit, driving the refrigerant pump, and switching the multiple valves to a state that causes the refrigerant having flowed through the indoor heat exchanger to return to the indoor heat exchanger via the supplementary heat exchanger and the refrigerant pump.

9. The air-conditioning apparatus of claim 7,
wherein the supplementary heat source unit further includes
- a supplementary compressor pipe connected to at least one third refrigerant pipe of the multiple third refrigerant pipes or at least one fourth refrigerant pipe of the multiple fourth refrigerant pipes, and
- a supplementary compressor disposed at the supplementary compressor pipe and configured to compress the refrigerant, and wherein the controller is configured to perform a supplementary heating operation by stopping the compressor in the outdoor unit, driving the supplementary compressor, and switching the multiple valves to a state that causes the refrigerant having flowed through the indoor heat exchanger to return to the indoor heat exchanger via the supplementary heat exchanger and the supplementary compressor.

10. An air-conditioning system comprising:
the air-conditioning apparatus of claim 6; and
a hot water tank configured to heat water and to supply water that is heated to the supplementary heat exchanger.

* * * * *